O. W. TAFT.
BIRD-CAGE.
No. 178,203. Patented May 30, 1876.
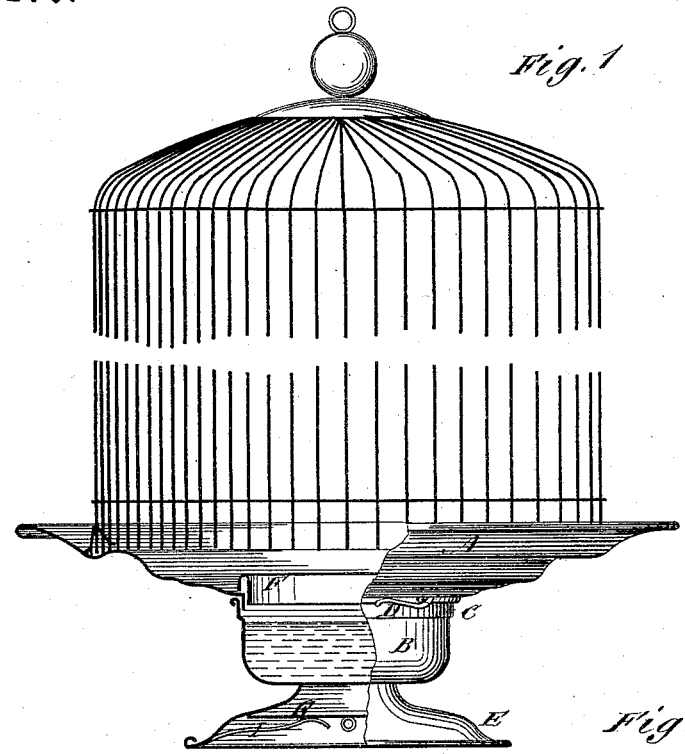
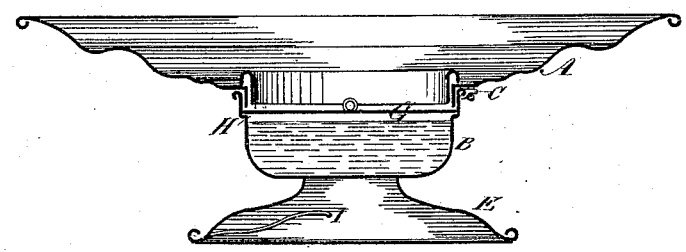
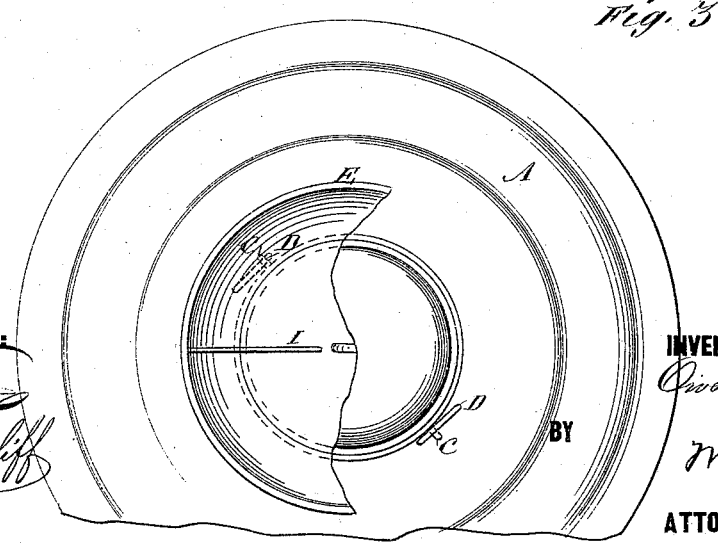
WITNESSES:
INVENTOR:
BY
ATTORNEYS

UNITED STATES PATENT OFFICE.

OWEN W. TAFT, OF NEW YORK, N. Y.

IMPROVEMENT IN BIRD-CAGES.

Specification forming part of Letters Patent No. 178,203, dated May 30, 1876; application filed May 23, 1876.

*To all whom it may concern:*

Be it known that I, OWEN W. TAFT, of the city, county, and State of New York, have invented a new and useful Improvement in Bird-Cages, of which the following is a specification:

My improvement in bird-cages consists of the opening for putting in and taking out the bird, also the bath-tub, feeding-dishes, &c., located in the bottom of the cage instead of the side, as heretofore, and the bath-tub, feed-dishes, and the like, or a support for the same, being contrived to form the door or closing device of the opening, and, in some cases, to be the stand or base to support the cage. This arrangement makes the cage more convenient, also more roomy for the bird, and the dishes are so supported as to be less liable to be turned over by the bird. The bird is not so liable to escape when opening the cage for any purpose, and the cups can be put in and taken out without interference with the perches.

Figure 1 is partly a side elevation and partly a section of a cage contrived according to my invention. Fig. 2 is a section of the bottom; and Fig. 3 is a plan of the bottom, with a part sectioned.

Similar letters of reference indicate corresponding parts.

A is the bottom plate of the cage, in the middle of which is a large opening for introducing the bird and the bathing and feeding cups, as shown in the drawing, in which B represents the bathing-cup, which fits up in the opening nicely, and is secured by the stud-pins C and clips D, like a bayonet-fastening; or it may be secured by any approved contrivance, and it has a base, E, on which to stand the cage. If preferred, the cup may extend up in the cage so that the base closes the opening. The cup thus forms a nice bath in the bottom of the cage; but, if preferred to have it extend farther up in the cage for feeding purposes, the studs D may be placed lower down on the cup. The cup can be put in the cage much better in this arrangement than through a side door, and the cage may be cleaned out without detaching the bottom, as is generally done for that purpose. F is a ring, fitting in the opening of the bottoms of the cage, and projecting upward a short distance, to prevent the seed and other matters dropping on the bottom from falling into the bath, and G is a removable cover to the cup, on which to make a sand bed in the bottom of the cage, if desired, said bottom being supported on an offset, H, made in the cup for that purpose. This cover G may be stored away in the hollow of the base E when not in use, in which it may be secured by a spring, I. J is a flange of the bottom of the cage, on which the cup fits in such manner that the water will not escape when the bird bathes.

Having thus described my invention, I claim as new and desire to secure by Letters Patent—

A bird-cage having the openings for the bath-tub and other cups, and for the ingress and egress of the bird, located in the bottom, and the said tub or cup or its support contrived to fasten in and form the closing device of said opening, substantially as specified.

OWEN W. TAFT.

Witnesses:
T. B. MOSHER,
C. L. TOPLIFF.